United States Patent
Al Hamouz et al.

(10) Patent No.: US 12,459,836 B2
(45) Date of Patent: Nov. 4, 2025

(54) METHOD OF ADSORBING CHLORIDE IONS IN AN AQUEOUS SOLUTION

(71) Applicant: KING FAHD UNIVERSITY OF PETROLEUM AND MINERALS, Dhahran (SA)

(72) Inventors: Othman Charles Al Hamouz, Dhahran (SA); Tawfik A. Saleh, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 717 days.

(21) Appl. No.: 17/889,896

(22) Filed: Aug. 17, 2022

(65) Prior Publication Data

US 2024/0059587 A1 Feb. 22, 2024

(51) Int. Cl.
*C02F 1/28* (2023.01)
*B01J 20/08* (2006.01)
*B01J 20/24* (2006.01)
*B01J 20/28* (2006.01)
*C02F 101/12* (2006.01)

(52) U.S. Cl.
CPC ............... *C02F 1/28* (2013.01); *B01J 20/08* (2013.01); *B01J 20/24* (2013.01); *B01J 20/28007* (2013.01); *B01J 20/28019* (2013.01); *B01J 20/28026* (2013.01); *C02F 1/281* (2013.01); *C02F 1/286* (2013.01); *C02F 2101/12* (2013.01); *C02F 2305/08* (2013.01)

(58) Field of Classification Search
CPC .. C02F 1/28; C02F 1/281; C02F 1/286; C02F 2101/12; B01J 20/08; B01J 20/24; B01J 20/28007; B01J 20/28026
See application file for complete search history.

(56) References Cited

U.S. PATENT DOCUMENTS

2020/0039851 A1   2/2020   Mundheim

FOREIGN PATENT DOCUMENTS

| CN | 102671633 B | | 2/2014 |
|---|---|---|---|
| CN | 104058483 A | * | 9/2014 |
| CN | 104968609 A | | 10/2015 |
| CN | 106995255 A | * | 8/2017 |
| CN | 112439417 A | | 3/2021 |
| CN | 110508249 B | * | 4/2022 |
| KR | 102195783 B1 | * | 6/2020 |
| WO | WO 03/050043 A2 | | 6/2003 |
| WO | WO 03/050043 A3 | | 6/2003 |

OTHER PUBLICATIONS

ResearchGate, Gupta (Year: 2015).*

(Continued)

*Primary Examiner* — In Suk C Bullock
*Assistant Examiner* — Fidan Bersin
(74) *Attorney, Agent, or Firm* — Oblon, McClelland, Maier & Neustadt, L.L.P.

(57) ABSTRACT

A method of adsorbing chloride ions from an aqueous solution with a nanocomposite. The nanocomposite including iron nanoparticles, aluminum nanoparticles and guar gum. The nanocomposite is in the form of extruded cylindrical particles in which the iron nanoparticles and the aluminum nanoparticles are dispersed in a matrix of the guar gum.

18 Claims, 10 Drawing Sheets

(56) References Cited

OTHER PUBLICATIONS

An extrusion method of tube with spiral inner fins by utilizing generation of spiral outer fins/grooves, Kuboki et. al (Year: 2018).*
Cross-linked bionanocomposites of hydrolyzed guar gum/magnetic layered double hydroxide as an effective sorbent for methylene blue removal, Tabatabaeian et. al (Year: 2021).*
Wanyou Zhang, et al., "Adsorption of chloride anion by calcined Mg—Al—Fe layered double hydroxides in wastewater", Applied Mechanics and Materials, Applied Materials and Technologies for Modern Manufacturing, vols. 423-426, Sep. 2013, pp. 545-549.
Reyhane Tabatabaeian, et al., "Cross-linked bionanocomposites of hydrolyzed guar gum/magnetic layered double hydroxide as an effective sorbent for methylene blue removal", Carbohydrate Polymers, vol. 257, No. 2, Jan. 10, 2021, 2 pages (Abstract only).
Si Si MA, et al., "Electrolytic removal of alizarin red S by Fe/Al composite hydrogel electrode for electrocoagulation toward a new wastewater treatment", Environmental Science & Pollution Research International, vol. 23, Issue 22, Nov. 2016, pp. 22771-22782.

* cited by examiner

FIG. 6A
FIG. 6B
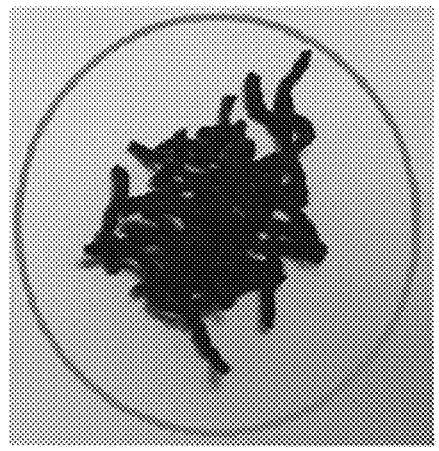
Iron Nanocomposite
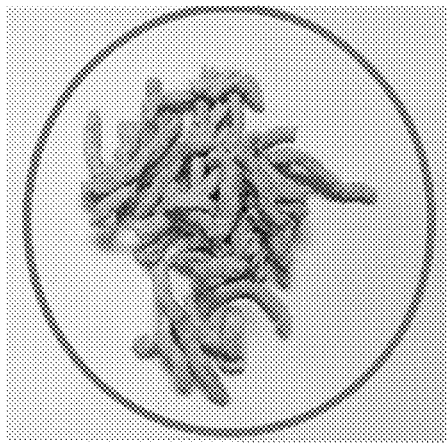
Aluminum Nanocomposite
FIG. 6C
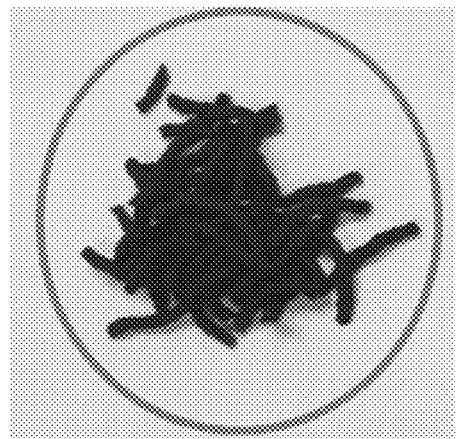
Aluminum-Iron Nanocomposite

METHOD OF ADSORBING CHLORIDE IONS IN AN AQUEOUS SOLUTION

BACKGROUND

Technical Field

The present disclosure is directed to water treatment process, particularly to a method for the adsorption and removal of chloride ions from an aqueous solution with a nanocomposite.

Description of Related Art

The "background" description herein generally presents the context of the disclosure. Work of the presently named inventors, to the extent it is described in this background section, as well as aspects of the description that may not otherwise qualify as prior art at the time of filing, are neither expressly nor impliedly admitted as prior art against the present invention.

Chloride is a common naturally occurring anion found in surface and water sources such as well water, groundwater, seawater, rainwater, and tap water. Chloride is generally in the form of salts such as potassium chloride, and sodium chloride. Although it is naturally occurring, it is found in greater concentrations where seawater and run-off from road salts can make their way into water sources. Therefore, well owners near oceans and road salting storage facilities are especially at risk for high levels of sodium chloride.

Although chlorides do not have harmful effects at low levels, water high in sodium chloride can damage plants if used for gardening/irrigation and give drinking water an unpleasant taste. Chloride anions are also corrosive and over time can damage plumbing, appliances, and water heaters. At even higher levels, sodium chloride can complicate existing heart problems and contribute to high blood pressure. Therefore, the EPA recommends levels no higher than 250 mg/L in water to avoid salty tastes and undesirable odors.

Conventionally, water treatment processes like a reverse osmosis (RO), distillation, and chromatographic techniques are used to remove high levels of salts in water. However, RO systems lead to water wastage of 3 to 20 times as much water as they produce. Another disadvantage of RO water filtration is that the RO systems remove healthy minerals such as calcium, magnesium, potassium, bicarbonates, and fluorides, in addition to removing chloride ions. Removing these minerals reduces the pH of the treated water, thereby making it more acidic, which can lead to other detrimental effects. Therefore, there remains a need for an affordable method that can efficiently and selectively remove chloride ions from water. Accordingly, it is one object of the present disclosure to provide a method of adsorbing chloride ions from an aqueous solution.

SUMMARY

In an exemplary embodiment, a method of adsorbing chloride ions in an aqueous solution is described. The method includes contacting a nanocomposite with the aqueous solution to form a mixture, where the nanocomposite adsorbs at least a portion of the chloride ions in the aqueous solution. The nanocomposite includes iron (Fe) nanoparticles, aluminum (Al) nanoparticles, and guar gum. The nanocomposite is in the form of extruded cylindrical particles in which the iron nanoparticles and the aluminum nanoparticles are dispersed in a matrix of the guar gum.

In some embodiments, the nanocomposite includes 15-25 weight percent (wt. %) iron nanoparticles, 15-25 wt. % aluminum nanoparticles, and 50-70 wt. % guar gum, based on a total weight of the iron nanoparticles, aluminum nanoparticles, and guar gum.

In some embodiments, the iron nanoparticles include 30-40 wt. % iron and 60-70 wt. % oxygen, based on a total weight of the iron and oxygen in the iron nanoparticles.

In some embodiments, the iron nanoparticles have a substantially spherical shape.

In some embodiments, the iron nanoparticles have an average size of 50-500 nanometers (nm).

In some embodiments, the iron nanoparticles form agglomerates and the agglomerates have a size of 100-1,000 nm.

In some embodiments, the aluminum nanoparticles include 30-40 wt. % aluminum and 60-70 wt. % oxygen, based on the total weight of the aluminum and oxygen in the aluminum nanoparticles.

In some embodiments, the aluminum nanoparticles have a substantially spherical shape.

In some embodiments, the aluminum nanoparticles have the average size of 10-300 nm.

In some embodiments, the aluminum nanoparticles form agglomerates and the agglomerates have the size greater than 1,000 nm.

In some embodiments, the nanocomposite includes the extruded cylindrical particles that have a helical shape and a rough surface.

In some embodiments, the nanocomposite includes the extruded cylindrical particles that have a length of 0.1 to 100 centimeters (cm).

In some embodiments, the nanocomposite includes the extruded cylindrical particles that have a diameter of 0.1 to 10 cm.

In some embodiments, the method further includes separating the aqueous solution from the mixture to leave the nanocomposite with adsorbed chloride ions.

In some embodiments, the method further includes stirring the mixture for at least one hour.

In some embodiments, the method further includes heating the mixture to a temperature of 50-100 degrees centigrade (° C.).

In some embodiments, the aqueous solution includes at least one additional ion selected from the group consisting of calcium, bicarbonate, magnesium, sodium, potassium, nitrate, and sulfate.

In some embodiments, the mixture has a ratio of milligrams (mg) of chloride ion to mg of the nanocomposite of 1 to 1-10.

In some embodiments, the nanocomposite has a chloride ion adsorption capacity of 330-360 mg of chloride ion per gram of the nanocomposite (mg/g).

The foregoing general description of the illustrative present disclosure and the following The detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 6A is an image of a nanocomposite comprising iron nanoparticles and guar gum, according to certain embodiments;

FIG. 6B is an image of a nanocomposite comprising aluminum nanoparticles and guar gum, according to certain embodiments; and FIG. 6C is an image of a nanocomposite comprising iron nanoparticles, aluminum nanoparticles, and guar gum, according to certain embodiments.

DETAILED DESCRIPTION

Figure 1:
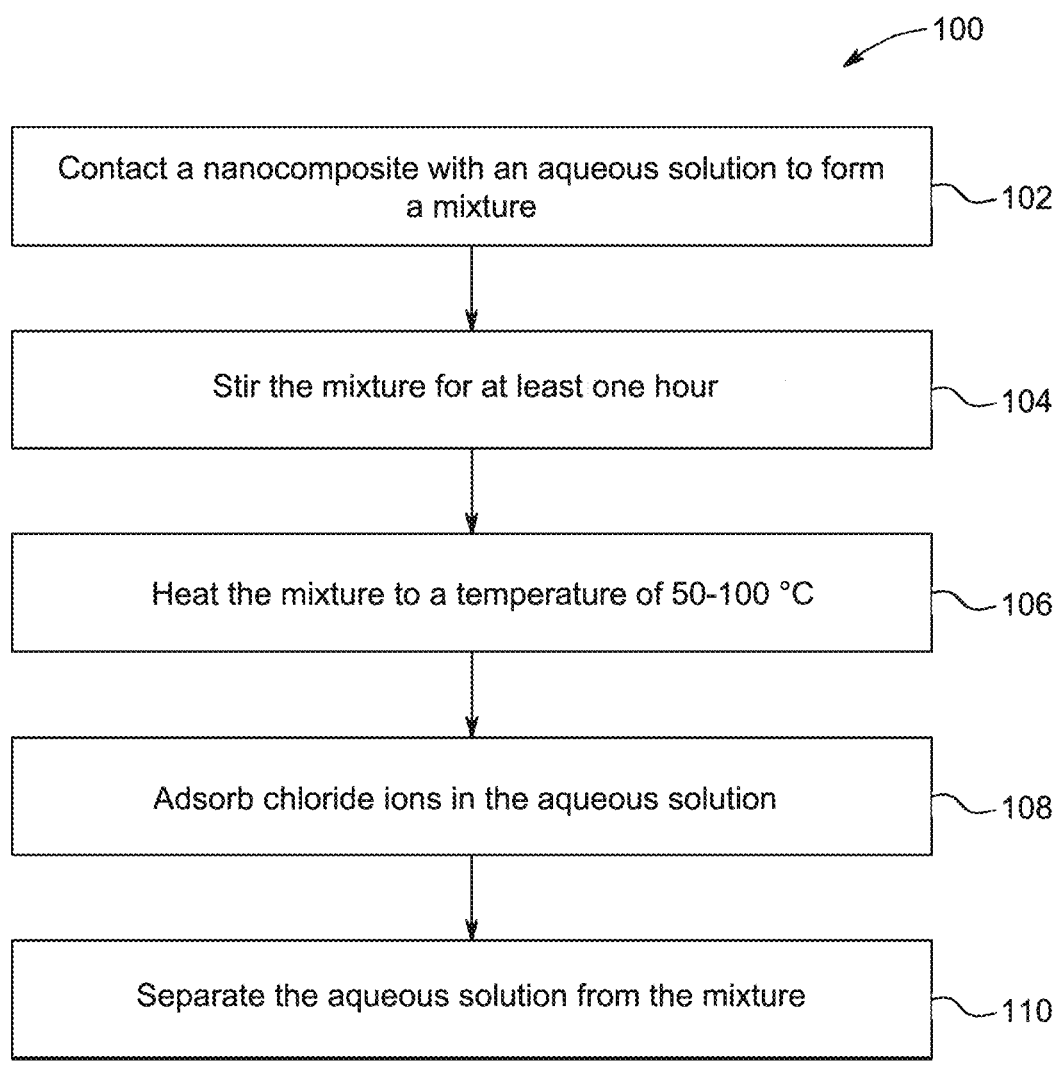
FIG. 1 is a schematic flow diagram of a method for adsorbing chloride ions in an aqueous solution, according to certain embodiments.

In the drawings, reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "nanoparticles" refers to a small particle that ranges between 1 to 1,000 nanometers in size.

As used herein, the term "nanocomposite" refers to a multiphase material in which, in contrast to microcomposites, at least one of the phases has one, two, or three dimensions of less than 100 nm, or the composite phases have nanoscale distances between them.

As used herein, the term, "aqueous solution" refers to a solution in which the solvent is mainly water or only water.

As used herein, the term, "polysaccharide" refers to long chain polymeric carbohydrates composed of monosaccharide units bound together by glycosidic linkages. Polysaccharides range in structure from linear to highly branched. Examples include storage polysaccharides such as starch, glycogen and galactogen and structural polysaccharides such as cellulose and chitin.

As used herein, the term "guar gum" refers to a galactomannan polysaccharide extracted from guar beans that has thickening and stabilizing properties useful in food, feed, and industrial applications.

Aspects of the present disclosure are directed to a method for adsorbing and removing contaminants in water with a nanocomposite. The nanocomposite is effective in adsorbing ion contaminants from an aqueous solution. Particularly, the nanocomposite is effective in adsorbing chloride ions from the aqueous solution.

Referring to FIG. 1, a schematic flow diagram of a method 100 for adsorbing chloride ions in an aqueous solution is illustrated. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes contacting a nanocomposite with the aqueous solution to form a mixture. In an embodiment, the aqueous solution can be drinking water, industrial wastewater, tap water, groundwater, river water, runoff streams, and static water bodies such as storage water. In an embodiment, the water is tap water. In an embodiment, the contacting occurs by submerging at least a portion, preferably 50%, 60%, 70%, 80%, 90%, or 100% of the nanocomposite in the aqueous solution. In an embodiment, the contacting occurs by adding a powder form of the nanocomposite into the aqueous solution. In an embodiment, 1-100 mg per mL of aqueous solution, of the nanocomposite is contacted with the aqueous solution, preferably 10-90 mg/mL, 20-80 mg/mL, 30-70 mg/mL, 40-60 mg/mL, or approximately 50 mg/mL.

In an embodiment, the nanocomposite is mixed into the aqueous solution by a method such as but not limited to, manually stirring, using a stir bar, or a probe sonicator. In an embodiment, the aqueous solution is heated prior to the contacting to a temperature in a range of 15-45° C., preferably 20-40° C., 25-35° C., or approximately 30° C.

In some embodiments, the nanocomposite includes iron nanoparticles, aluminum nanoparticles, and guar gum. In some embodiments, the nanocomposite includes aluminum nanoparticles and guar gum. In an embodiment, the nanocomposite includes iron nanoparticles and guar gum. In some embodiments, the nanocomposite includes 15-25 wt. % iron nanoparticles, preferably 17-23 wt. %, or approximately 20 wt. %, 15-25 wt. % aluminum nanoparticles, preferably 17-23 wt. %, or approximately 20 wt. %, and 50-70 wt. % guar gum, preferably 55-65 wt. %, or approximately 60 wt. % based on the total weight of the iron nanoparticles, aluminum nanoparticles, and guar gum. In an embodiment, the nanocomposite includes 20 wt. % aluminum nanoparticles 20 wt. % iron nanoparticles, and 60 wt. % guar gum, based on the total weight of the iron nanoparticles, aluminum nanoparticles, and guar gum. In an embodiment, the iron and aluminum nanoparticles are in the nanocomposites in an equal wt. % amount. In an embodiment, the iron and aluminum nanoparticles are in the nanocomposites in an unequal wt. % amount. In an embodiment, the nanocomposite includes 10 wt. % aluminum nanoparticles 30 wt. % iron nanoparticles, and 60 wt. % guar gum, based on the total weight of the iron nanoparticles, aluminum nanoparticles, and guar gum.

In an embodiment, the nanocomposite includes the naturally occurring polysaccharide guar gum. In an embodiment, guar gum, also called guaran, is a galactomannan polysaccharide extracted from guar beans that has thickening and stabilizing properties useful in food, feed, and industrial applications. In an embodiment, guar gum is an exo-polysaccharide composed of the sugars, galactose and mannose. The backbone is a linear chain of β 1,4-linked mannose residues to which galactose residues are 1,6-linked at every second mannose, forming short side-branches, as shown in formula (I) below.

Formula (I)

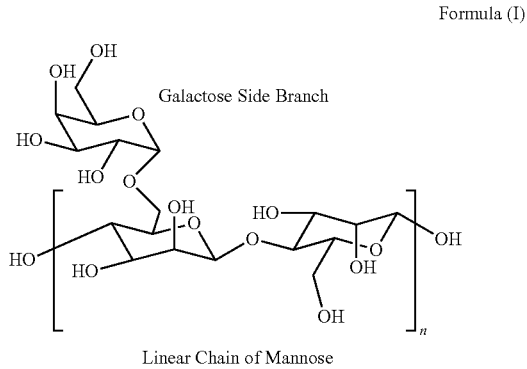

Linear Chain of Mannose

In an embodiment, guar gum is known to undergo crosslinking. In an embodiment, the crosslinking is due to hydrogen bonding. In an embodiment, the guar gum is cross linked with at least one metal by forming a metal-hydroxyl complex. In an embodiment, the metal may include but is not limited to chromium, aluminum, antimony, zirconium, iron, and boron. In an embodiment, the metal may be in nanoparticle form. In an embodiment, the crosslinking is with aluminum and/or iron nanoparticles.

In an embodiment, guar gum may further comprise another polysaccharide known to crosslink with multivalent cations, this includes products from marine plants, terrestrial plants, microbial polysaccharides and polysaccharide derivatives, such as agar, dextran, carboxy methyl cellulose, alginates, gum arabic, gellan gum, methyl hydroxypropyl cellulose, carrageenan gum tragacanth, rhamsan gum, hydroxypropyl cellulose, furcellaran, karaya gum, welan gum, hydroxyethyl cellulose, locust bean gum, xanthan gum, propylene glycol alginate, pectin, curdlan, hydroxypropyl guar, tamarind seed gum and pullulan.

In an embodiment, the iron nanoparticles contain iron ions that can exist in 0 or +2 oxidation states. In an embodiment, the iron nanoparticles can include different polymorphs of iron-oxides (magnetite ($Fe_3O_4$), maghemite ($\gamma$-$Fe_2O_3$), hematite ($\alpha$-$Fe_2O_3$)), oxyhydroxides (iron oxyhydroxide (Fe—OOH)), iron hydroxides, and zero-valent iron nanoparticles, or a combination thereof. In an embodiment, the iron nanoparticles are magnetite ($Fe_3O_4$) iron oxide nanoparticles. In an embodiment, the iron nanoparticles are maghemite ($\gamma$-$Fe_2O_3$) iron oxide nanoparticles. In an embodiment, the iron nanoparticles include 20-40 wt. % iron, preferably 25-35 wt. %, or approximately 30 wt. % and 60-80 wt. % oxygen, preferably 65-75 wt. %, or approximately 60 wt. % based on the total weight of the iron and oxygen in the iron nanoparticles.

In an embodiment, the iron nanoparticles have a substantially spherical shape. In some embodiments, the iron nanoparticles may have a spherical, rod, oval, cubic, triangular, star, needle, octahedral, hexagonal, pentagonal, flower, platelet, or cylindrical shape. In some embodiments, the iron nanoparticles have the average size of 50-500 nm, preferably 60-450 nm, 70-400 nm, 80-350 nm, 90-300 nm, 100-250 nm, or 150-200 nm. In some embodiments, the iron nanoparticles form agglomerates and the agglomerates have the size of 100-1,000 nm, preferably 200-900 nm, 300-800 nm, 400-700 nm, or 500-600 nm. In some embodiments, the iron nanoparticles form agglomerates larger than 1,000 nm, preferably 1,000 to 10,000 nm, 1,500 to 8,000 nm, 2,000 to 7,000 nm, 3,000 to 6,000 nm, 4,000 to 5,000 nm. In some embodiments, the iron nanoparticles may be prepared by any methods known in the art. The iron nanoparticles can effectively bring about de-chlorination by reacting with excess chlorine or chloride ions in the water to form iron salts, such as ferrous chloride and ferric chloride. The iron nanoparticles also de-chlorinate by forming a complex with the chloride ions and/or through intermolecular forces.

In an embodiment, the aluminum nanoparticles can include metallic aluminum and various polymorphic forms and hydration states of aluminum oxide. In an embodiment, the aluminum nanoparticles are aluminum oxide ($Al_2O_3$) nanoparticles. In an embodiment, the aluminum nanoparticles include 20-40 wt. % aluminum, preferably 25-35 wt. %, or approximately 30 wt. % and 60-80 wt. % oxygen, preferably 65-75 wt. %, or approximately 60 wt. % based on the total weight of the aluminum and oxygen in the aluminum nanoparticles.

In an embodiment, the aluminum nanoparticles have a substantially spherical shape. In some embodiments, the aluminum nanoparticles may have a spherical, rod, oval, cubic, triangular, star, needle, octahedral, hexagonal. pentagonal, flower, platelet, or cylindrical shape. In some embodiments, the aluminum nanoparticles have the average size of 10-300 nm, preferably 25-250 nm, 50-200 nm, or 100-150 nm. In some embodiments, the aluminum nanoparticles form agglomerates and the agglomerates have the size greater than 1,000 nm, preferably 1,000 to 10,000 nm, 1,500 to 8,000 nm, 2,000 to 7,000 nm, 3,000 to 6,000 nm, 4,000 to 5,000 nm. In some embodiments, the agglomerates are less than 1,000 nm, preferably 100-1,000 nm, 200-900 nm, 300-800 nm, 400-700 nm, or 500-600 nm. In some embodiments, the aluminum nanoparticles may be prepared by any methods known in the art. The aluminum nanoparticles serve as versatile adsorbents owing to their high surface area, high surface energies, and availability of surface functional groups for binding to contaminants, such as chlorine. The aluminum nanoparticles also de-chlorinate by forming a complex with the chloride ions and/or through intermolecular forces.

In some embodiments, the agglomerates are only aluminum nanoparticles or only iron nanoparticles. In some embodiments, the agglomerates are a mixture of aluminum and iron nanoparticles. In some embodiments, the nanoparticles interact through electrostatic, or van der Waals forces. In an embodiment, the surface of the aluminum nanoparticles are modified with a ligand to promote interaction with the iron nanoparticles and/or the guar gum. In an embodiment, the surface of the iron nanoparticles are modified with a ligand to promote interaction with the aluminum nanoparticles and/or the guar gum. In an embodiment, the ligand may include but is not limited to cetyltri-methylammonium bromide, hexadecylamine, oleyamine, sodium citrate, 2-mercaptoethanol, acetic acid, acrylic acid, ammonium thiocyanate, ethanedithiol, and polyethylene glycol. In an embodiment, the ligands interact through ligand interdigitation, hydrogen bonding, and/or electrostatic interactions.

In an embodiment, the nanocomposite is in the form of extruded particles in which the iron nanoparticles and the aluminum nanoparticles are dispersed in a matrix of the guar gum. Throughout the present disclosure, the term "extruded" and variations thereof refers to a shape obtained by forcing a material under pressure and/or shear through a die. In an embodiment, the aluminum nanoparticles and iron nanoparticles are homogeneously distributed in a matrix of the guar gum. In an embodiment, the aluminum nanoparticles and iron nanoparticles are not homogeneously distributed in a matrix of the guar gum.

In an embodiment, the extruded shape may be but is not limited to a sphere, a cube, a cylinder, a pentagonal prism, a hexagonal prism, an octagonal prism, a nonagonal prism, decagonal prism, or a cuboid. In a preferred embodiment, the extruded particles are cylindrical. In an embodiment, the extruded cylindrical particles are twisted to form a helical shape. In an embodiment, the helix is twisted at an angle of 5-45°, preferably 10-40°, 15-35°, 20-30°, or approximately 25°. In an embodiment, the extruded cylindrical particles are twisted during the extrusion process. In an embodiment, the extruded cylindrical particles are twisted after the extrusion process. In an embodiment, the cylindrical extruded particles have a helical shape to increase contact surface area. In an embodiment, the cylinders may be hollow. In an embodiment, the cylinders are solid. In an embodiment, the cylinders have a bulk density of 0.01-1 $g/cm^3$, preferably 0.05-0.5 $g/cm^3$, or 0.1-0.3 $g/cm^3$.

In an embodiment, a surface of the extruded particles is smooth. In an embodiment, a surface of the extruded particles is rough. In an embodiment, the roughness is due to small pores or bubbles on the surface of the extruded particles. In an embodiment, a rough surface of the extruded particles is where at least 30%, preferably 40%, 50%, 60%, 70%, 80%, 90%, or 100% of the surface area has a bubble or pore. In an embodiment, the pores are less than 1 mm in diameter, preferably 0.1-1 mm, 0.2-0.9 mm, 0.3-0.8 mm, 0.4-0.7 mm, or 0.5-0.6 mm. In an embodiment, the pores are less than 1 mm deep, preferably 0.1-1 mm, 0.2-0.9 mm, 0.3-0.8 mm, 0.4-0.7 mm, or 0.5-0.6 mm. In an embodiment, the pores have a volume of 0.1-1 $mm^3$, preferably 0.2-0.9 $mm^3$, 0.3-0.8 $mm^3$, 0.4-0.7 $mm^3$, or 0.5-0.6 $mm^3$. In an embodiment, the bubbles are less than 1 mm in diameter, preferably 0.1-1 mm, 0.2-0.9 mm, 0.3-0.8 mm, 0.4-0.7 mm, or 0.5-0.6 mm. In an embodiment, the bubbles are less than 1 mm high, preferably 0.1-1 mm, 0.2-0.9 mm, 0.3-0.8 mm, 0.4-0.7 mm, or 0.5-0.6 mm. In an embodiment, the bubbles have a volume of 0.1-1 $mm^3$, preferably 0.2-0.9 $mm^3$, 0.3-0.8 $mm^3$, 0.4-0.7 $mm^3$, or 0.5-0.6 $mm^3$. In an embodiment, the extruded particles have a combination of rough and smooth surfaces. In an embodiment, the extruded particles have a length of 0.1 to 100 cm, preferably 1-90 cm, 10-80 cm, 20-70 cm, 30-60 cm, or 40-50 cm. In an embodiment, the extruded particles are cylindrical and have a diameter of 0.1 to 10 cm, preferably 1-9 cm, 2-8 cm, 3-7 cm, 4-6 cm, or approximately 5 cm.

A method of making the nanocomposite is described. The order in which the method is described is not intended to be construed as a limitation, and any number of the described method steps may be combined in any order to implement the method. Additionally, individual steps may be removed or skipped from the method without departing from the spirit and scope of the present disclosure.

In an embodiment, the iron nanoparticles, aluminum nanoparticles, and guar gum are added together. In an embodiment, the iron nanoparticles, aluminum nanoparticles, and guar gum are mixed by any method known in the art including by not limited to, manually with a stirring rod or a mortar and pestle, and magnetically with a stir bar. In an embodiment, a powder is formed with the mixture of the iron nanoparticles, aluminum nanoparticles, and guar gum. In an embodiment, the powder is homogeneous. In an embodiment, water is added to the powder to form a paste. In an embodiment, the water is deionized water. In an embodiment, a minimal amount of water is added to form the paste. In an embodiment, the water is heated to 25 to 60° C., preferably 30-55° C., 35-50° C., or 40-45° C. prior to adding to promote formation of the paste. In an embodiment, the aluminum nanoparticles and iron nanoparticles are homogeneously distributed in a matrix of the guar gum in the paste. In an embodiment, the aluminum nanoparticles and iron nanoparticles are not homogeneously distributed in a matrix of the guar gum in the paste.

In an embodiment, the paste is extruded through a die to form an extruded nanocomposite. The extrusion is carried out by heating the paste at a temperature above the boiling point of water. As the material exits the die is expands and forms a rough surface. In an embodiment, the die is any shape known in the art including but not limited to a helical, triangle, circle, semi-circle, square, rectangle, parallelogram, rhombus, trapezium, kite, pentagon, hexagon, octagon, nonagon, or decagon. In an embodiment, the width of the hole in the die in its longest dimension is 0.1 to 10 cm, preferably 1-9 cm, 2-8 cm, 3-7 cm, 4-6 cm, or approximately 5 cm. In an embodiment, as the paste is extruded through the die the cross section of the paste forms into the shape of the die and continues down the longitudinal axis. For example, if the shape of the die is a circle, the extruded shape formed is a cylinder. In an embodiment, the paste is extruded until the length of the extruded nanocomposite reaches 0.1 to 100 cm, preferably 1-90 cm, 10-80 cm, 20-70 cm, 30-60 cm, or 40-50 cm.

In an embodiment, the extruded nanocomposite is dried for at least 10 hours, preferably 20 hours, 30 hours, 40 hours, 50 hours, 60 hours, 70 hours, 80 hours, 90 hours, or 100 hours to form the nanocomposite. In an embodiment, the extruded nanocomposite is dried under ambient conditions. In an embodiment, the extruded nanocomposite is dried in an oven. In an embodiment, the extruded nanocomposite is dried at a temperature of 25 to 100° C., preferably 30-90° C., 40-80° C., 50-70° C., or approximately 60° C.

At step 104, the method 100 includes stirring the mixture of the aqueous solution and the nanocomposite for at least one hour. The stirring may be done manually or with the help of a magnetic stirrer. In some embodiments, the mixture is stirred for 2-4 hours, preferably 3 hours.

At step 106, the method 100 includes heating the mixture of the aqueous solution and the nanocomposite to a temperature of 50-100° C., preferably 60-90° C., or 70-80° C. In an embodiment, the heating is to promote contact between the ions in the aqueous solution and the nanocomposite. In an embodiment, the steps 104, 106, and 108 of the method 100 occur simultaneously.

At step 108, the method 100 includes adsorbing chloride ions present in the aqueous solution onto and/or in the nanocomposite. In an embodiment, the adsorbing may occur without the steps 104 and 106 of the method 100. In an embodiment, the aqueous solution includes chloride ions. In some embodiments, the aqueous solution includes at least one additional ion, in addition to the chloride ion. In an embodiment, the aqueous solution includes anions such as but not limited to oxide, hydroxide, fluoride, sulfide, chloride, nitride, bromide, iodide, phosphate, hydrogen phosphate, dihydrogen phosphate, sulfate, nitrate, hydrogen sulfate, nitrite, thiosulfate, sulfite, perchlorate, iodate, carbonate, chromate, bicarbonate, and/or dichromate. In an embodiment, the aqueous solution includes cations such as but not limited to calcium, magnesium, potassium, copper (II), hydrogen, iron (II), iron (III), mercury, silver, sodium, and/or ammonium. In an embodiment, the additional ion is at least one selected from the group consisting of calcium, bicarbonate, magnesium, sodium, potassium, nitrate, and sulfate. In an embodiment, the nanocomposite adsorbs only chloride anions from the aqueous solution. In an embodiment, the nanocomposite is selective for chloride anions. In an embodiment, the nanocomposite adsorbs any monovalent anions in the aqueous solution. In an embodiment, the nanocomposite adsorbs any anions in the aqueous solution. In an embodiment, the nanocomposite adsorbs any cations in the aqueous solution.

In some embodiments, the mixture has a ratio of mg of chloride ion to mg of nanocomposite of 1 to 1-10, preferably 1 to 1, 1 to 2, 1 to 3, 1 to 4, 1 to 5, 1 to 6, 1 to 7, 1 to 8, 1 to 9, 1 to 10. In some embodiments, the nanocomposite has a chloride ion adsorption capacity of 330-360 mg of chloride ion per gram of nanocomposite (mg/g). In some embodiments the nanocomposite has a chloride ion adsorption capacity of 330-360 mg/g, preferably 335-355 mg/g, 340-350 mg/g, or approximately 345 mg/g. In some embodiments, a nanocomposite including only aluminum nanoparticles and guar gum has a chloride ion adsorption capacity of 230-260 mg/g, preferably 235-255 mg/g, 240-250 mg/g, or approximately 245 mg/g. In some embodiments, a nanocomposite including only iron nanoparticles and guar gum has a chloride ion adsorption capacity of 260-290 mg/g, preferably 265-285 mg/g, 270-280 mg/g, or approximately 275 mg/g.

At step 110, the method 100 includes separating the aqueous solution from the mixture to leave the nanocomposite with adsorbed chloride ions. The aqueous solution and nanocomposite can be separated using any methods known in the art, including but not limited to decanting, filtration, or physically removing the nanocomposite with a tool such as tweezers. In some embodiments, the nanocomposite may be separated from the aqueous solution by filtration. In some embodiments, the aqueous solution can further be characterized to determine the content of chloride after the method 100. In an embodiment, the nanocomposite absorbs at least a portion of the chloride ions in the aqueous solution, preferably 10%, 20%, 30%, 40%, 50%, 60%, 70%, 80%, or 90%. In an embodiment, the aqueous solution no longer includes chloride.

In an embodiment, the nanocomposite is incorporated into a water filtration system. In an embodiment, drinking water is passed over the nanocomposite before it comes out of a tap or any water faucet. In an embodiment, chloride ions are adsorbed by the nanocomposite as the water passes over, thereby generating safer drinking water.

EXAMPLES

The following examples demonstrate use of the nanocomposites for the removal of chloride ions from the aqueous solution described herein. The examples are provided solely for illustration and are not to be construed as limitations of the present disclosure, as many variations thereof are possible without departing from the spirit and scope of the present disclosure.

Example 1: Characterization of the Iron (Fe) Nanoparticles

Figure 2A:
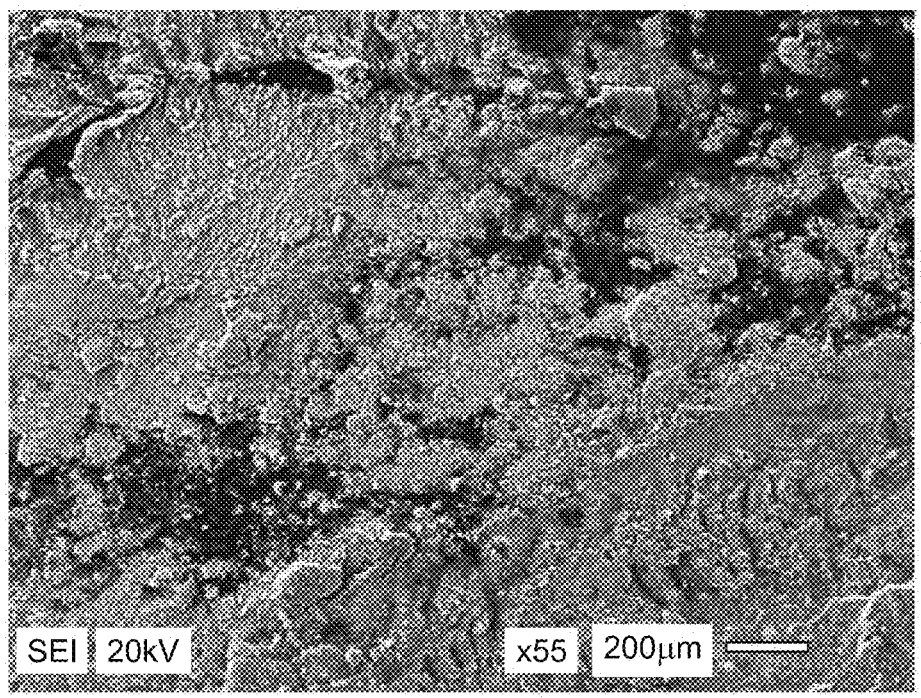
FIG. 2A illustrates a scanning electron microscope (SEM) image of iron (Fe) nanoparticles at 55× magnification, according to certain embodiments.
Figure 2B:
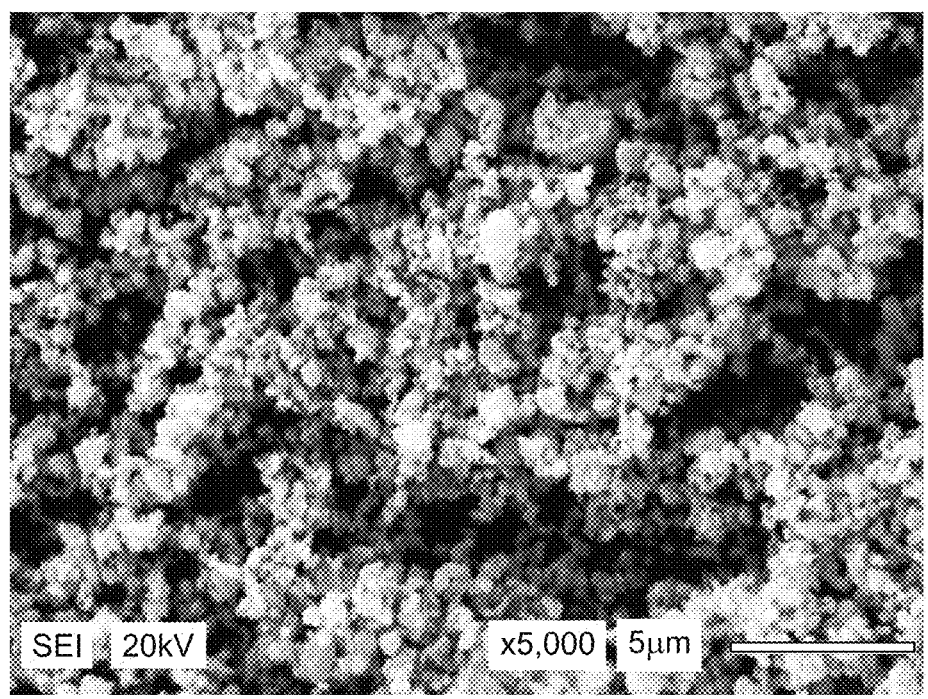
FIG. 2B illustrates the SEM image of the Fe nanoparticles at 5000× magnification, according to certain embodiments.
Figure 2C:
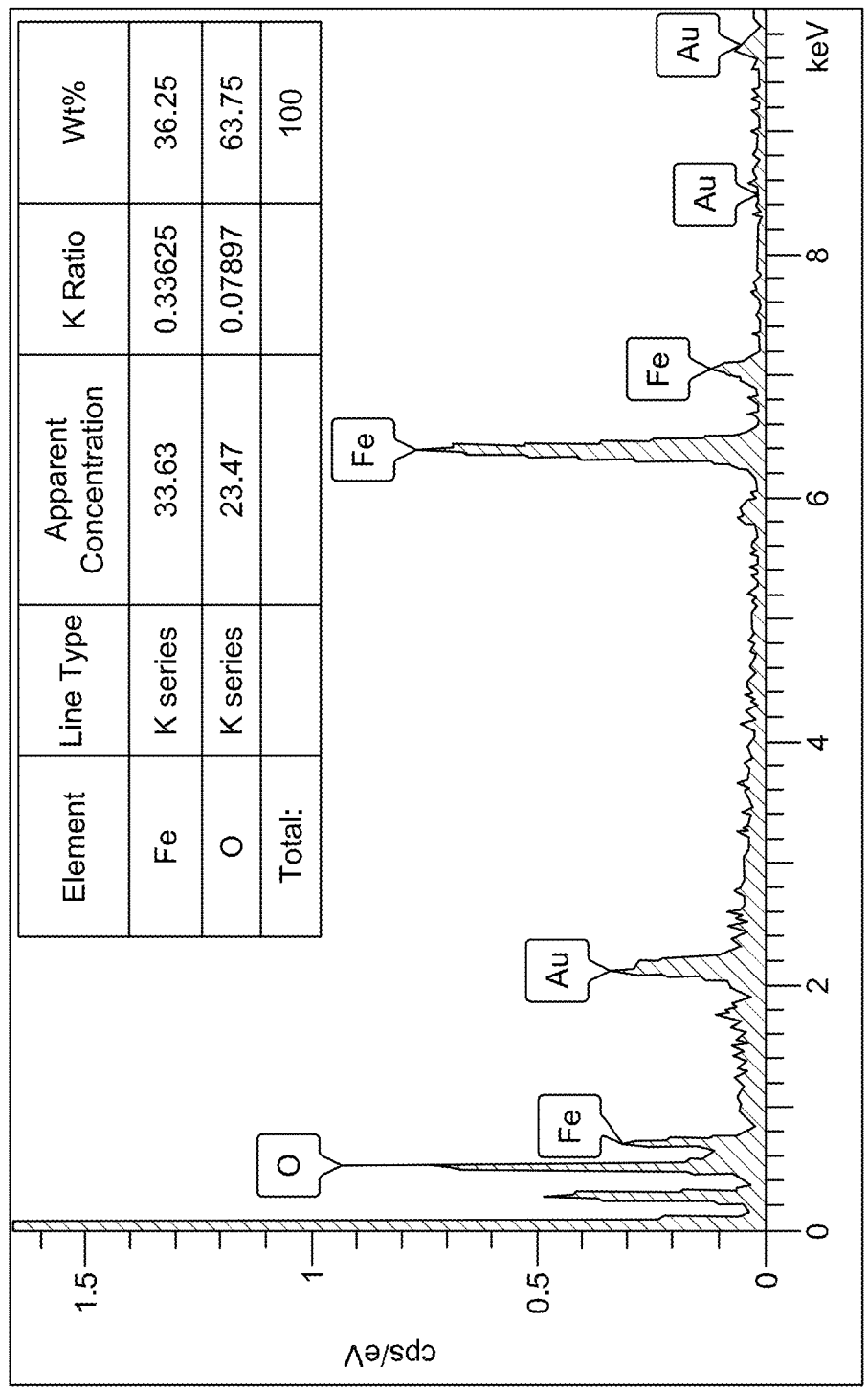
FIG. 2C illustrates an energy-dispersive X-ray (EDX) spectrum of the iron nanoparticles which shows the two elements forming the particles, iron, and oxygen, with the percentages shown in the table, according to certain embodiments.
Figure 2D:
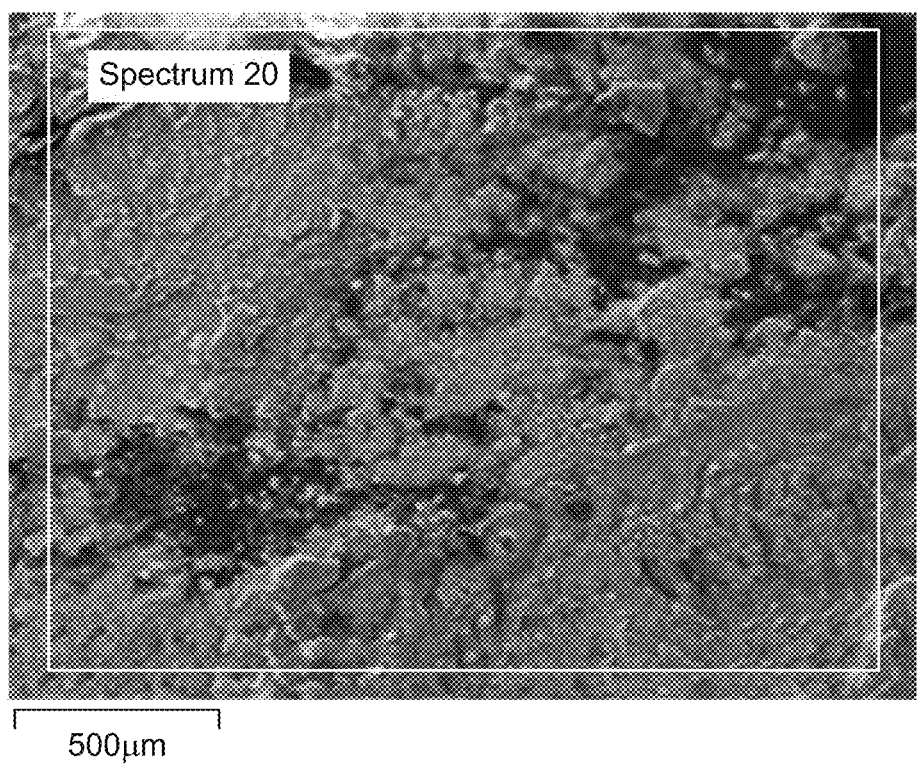
FIG. 2D illustrates the SEM image from which EDX spectrum is obtained, according to certain embodiments.

The previously synthesized iron nanoparticles were characterized using scanning electron microscopy with energy-dispersive X-ray spectroscopy (SEM/EDX) analysis and Fourier transform infrared (FTIR) spectroscopy. FIG. 2A, an SEM image with a magnification of 55 times, shows that the iron nanoparticles were fine particles. FIG. 2B, an SEM image with a magnification of 5,000 times, shows that the iron nanoparticles particles had a spherical shape and were aggregated. FIG. 2C depicts an EDX spectrum of the iron nanoparticles, indicating that two elements formed the particles, iron, and oxygen, with percentages shown in the inset table. The gold shown in the spectrum was from the coating used during the SEM analysis. The iron nanoparticles were found to be made of 36.25 wt. % iron and 63.75 wt. % oxygen. FIG. 2D illustrates the SEM image from which the EDX spectrum was obtained.

Figure 3:
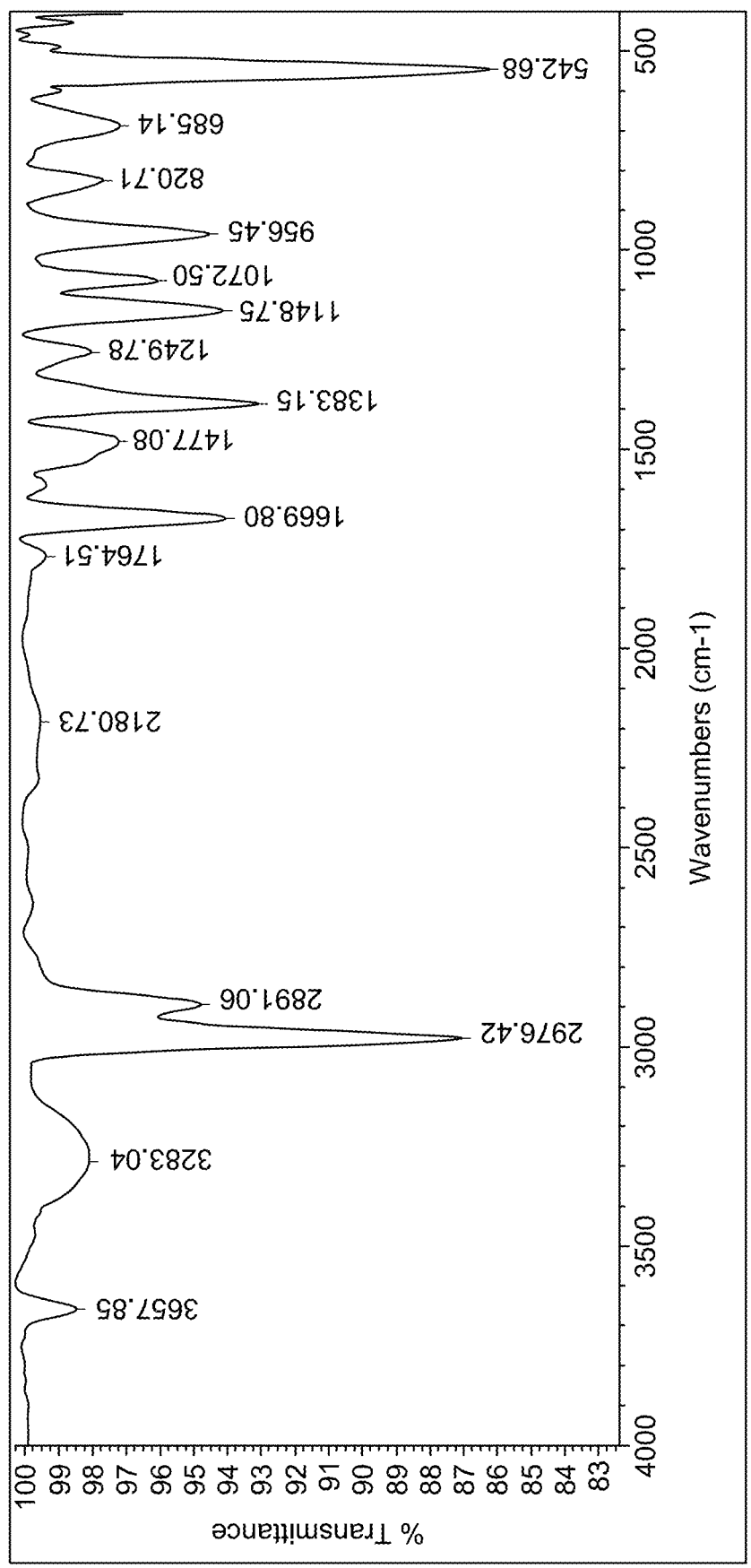
FIG. 3 illustrates a Fourier transform infrared (FTIR) spectrum of the Fe nanoparticles, according to certain embodiments.

FIG. 3 displays a FTIR spectrum of the iron nanoparticles. A band at around 542 $cm^{-1}$ was ascribed to the metal-oxygen bond, i.e. Fe—O bond. The bands at 2890 and 2980 $cm^{-1}$ were assigned to the hydrocarbons $CH_2$ used in the modification with the guar gum.

Example 2: Characterization of the Aluminum (Al) Nanoparticles

Figure 4A:
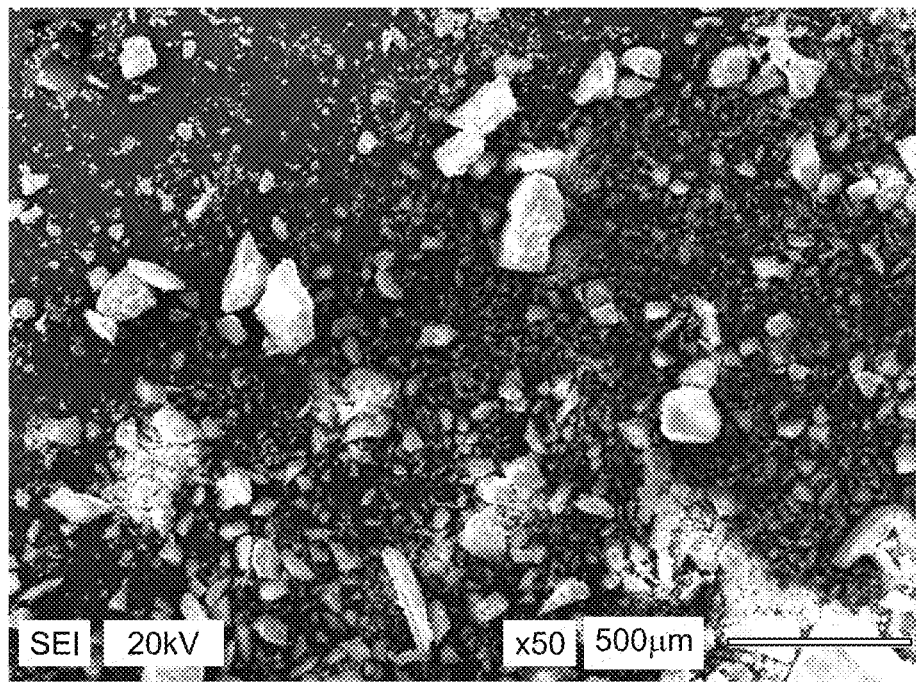
FIG. 4A illustrates the SEM image of aluminum (Al) nanoparticles at 50× magnification, according to certain embodiments.
Figure 4B:
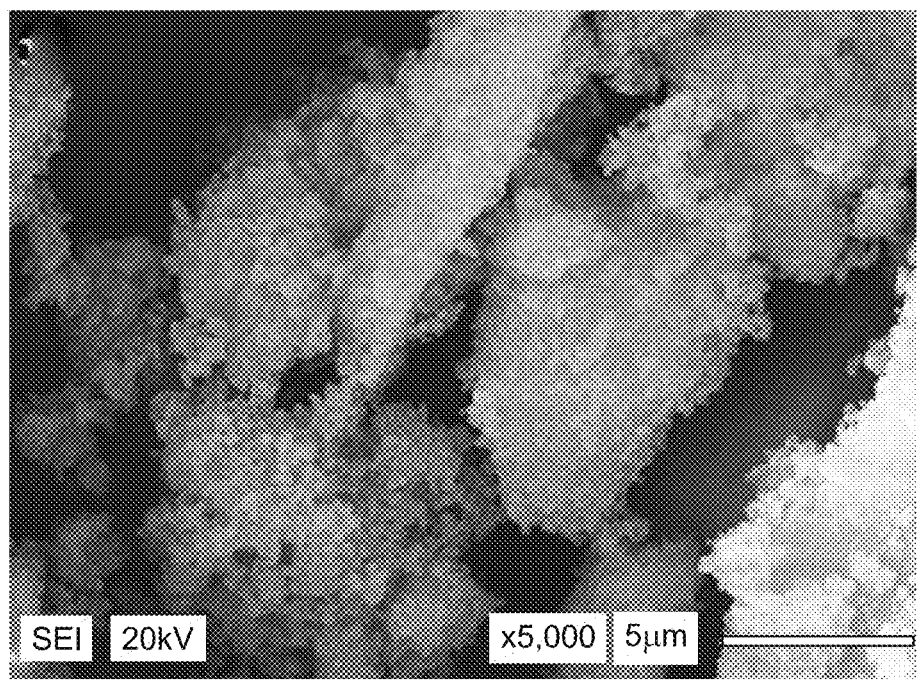
FIG. 4B illustrates the SEM image of the Al nanoparticles at 5000× magnification, according to certain embodiments.
Figure 4C:
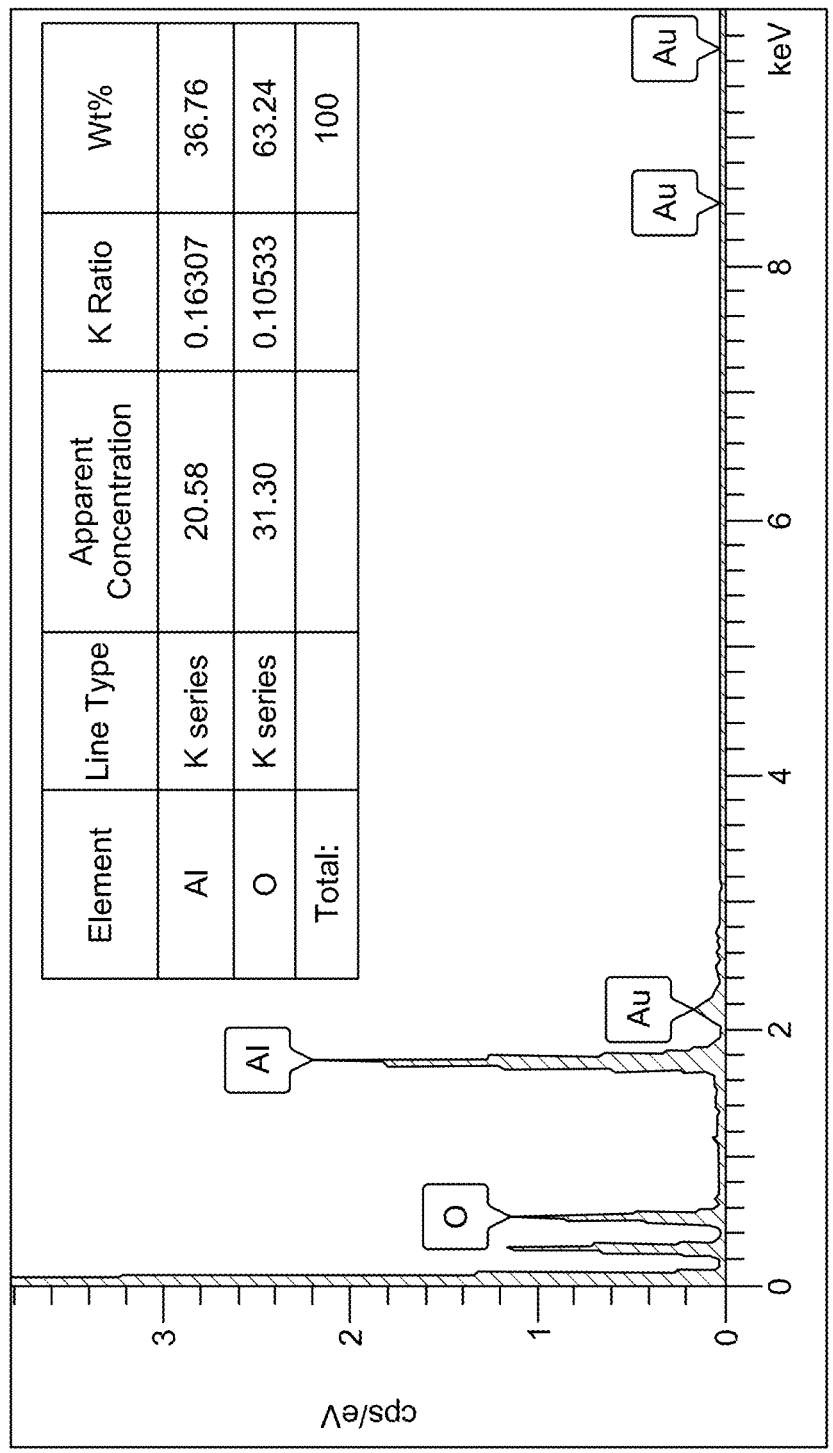
FIG. 4C illustrates the EDX spectrum of the Al nanoparticles, which shows the two elements forming the particles, aluminum, and oxygen, with the percentages shown in the table, according to certain embodiments.
Figure 4D:
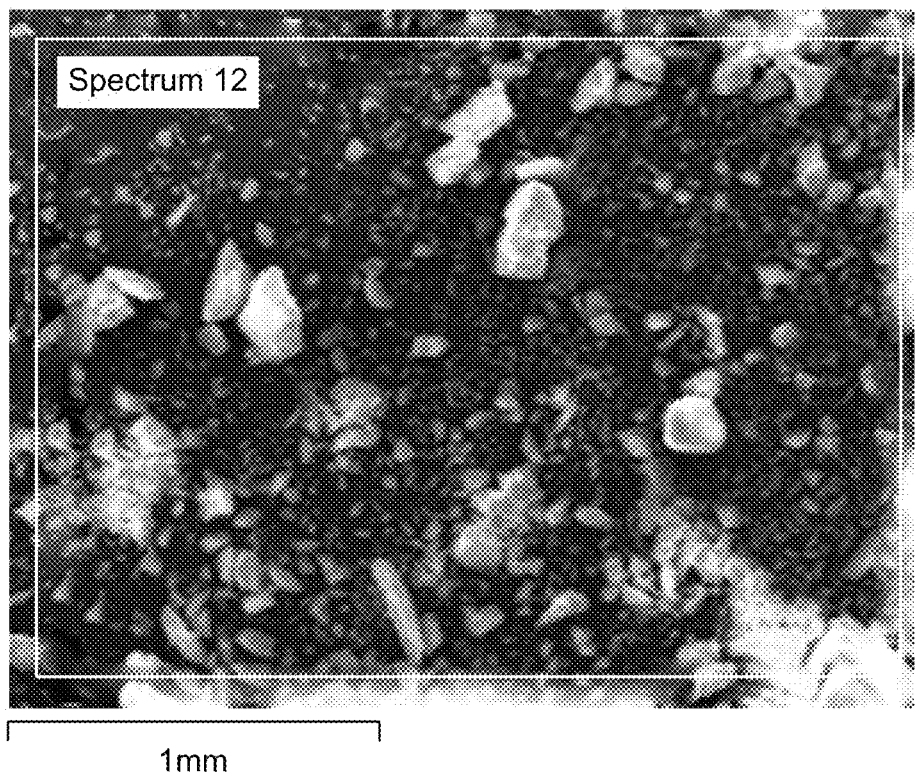
FIG. 4D illustrates the SEM image from which EDX spectrum is obtained, according to certain embodiments.

The previously synthesized aluminum nanoparticles were characterized using SEM/EDX analysis and FTIR spectroscopy. FIG. 4A, an SEM image with a magnification of 50 times, show that the aluminum nanoparticles were fine particles. FIG. 4B, an SEM image with a magnification of 5,000 times, shows that the aluminum nanoparticles particles had a spherical shape and were aggregated. FIG. 4C depicts an EDX spectrum of the aluminum nanoparticles, indicating that two elements formed the particles, aluminum, and oxygen, with percentages shown in the inset table. The gold shown in the spectrum was from the coating used during the SEM analysis. The aluminum nanoparticles were found to be made of 36.76 wt. % iron and 63.24 wt. % oxygen. FIG. 4D illustrates the SEM image from which the EDX spectrum was obtained.

Figure 5:
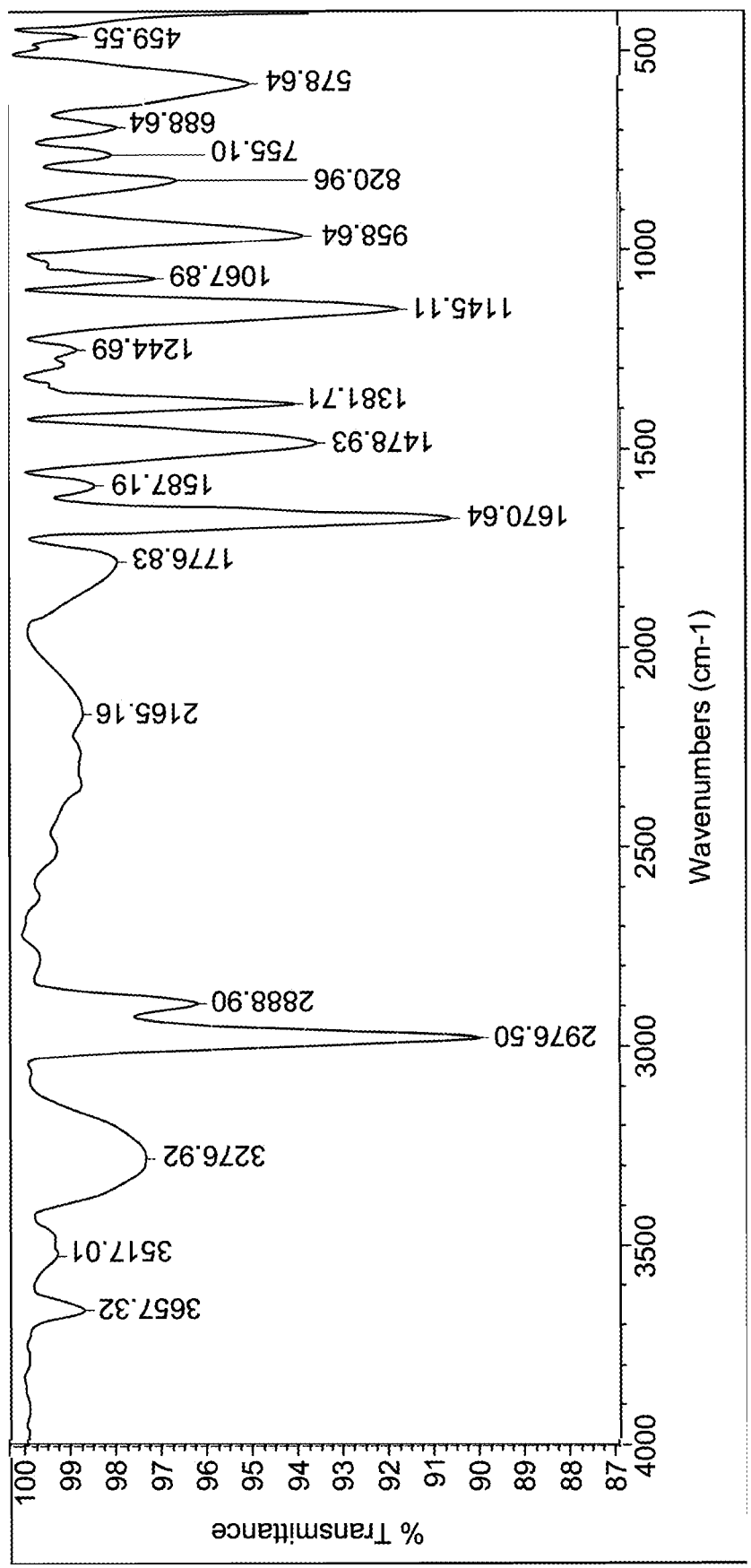
FIG. 5 illustrates the FTIR spectrum of the Al nanoparticles, according to certain embodiments.

FIG. 5 displays a FTIR spectrum of the aluminum nanoparticles. The band at around 578 $cm^{-1}$ was ascribed to the metal-oxygen bond, i.e. Al—O. Bands at 2880 $cm^{-1}$ and 2980 $cm^{-1}$ were assigned to the hydrocarbons $CH_2$ used in the modification with the guar gum.

Example 3: Nanocomposite Synthesis

In a typical experiment, quantities of aluminum nanoparticles, iron nanoparticles, and guar gum were mixed with mortar and pestle until a homogeneous powder was formed. The quantities of the aluminum nanoparticles, iron nanoparticles, and guar gum are shown in Table 1. Then water was added to the homogeneous powder until a homogeneous paste was formed. The paste was extruded and dried for three days under ambient conditions. The same procedure was used to make the nanocomposite with only iron or only aluminum nanoparticles. Pictures depicting the aluminum-iron nanocomposite, the aluminum nanocomposite, and the iron nanocomposite are shown in FIG. 6C, FIG. 6B, and FIG. 6A, respectively.

TABLE 1

| Composite | Al nanoparticles (g) | Fe nanoparticles (g) | Binder (guar gum) | Adsorption capacity (mg/g) |
|---|---|---|---|---|
| Al—Fe nanocomposite | 0.75 | 0.75 | 2 | 346 |
| Al nanocomposite | 1.5 | 0 | 2 | 256.6 |
| Fe nanocomposite | 0 | 1.5 | 2 | 274 |

Example 4: Analysis of Chloride Ions Adsorption

In a typical experiment, a chloride solution of 20,000 milligrams per liter (mg/L) (mg of chloride ion per liter of water), was prepared by dissolving the required amount of sodium chloride in distilled water. Then, 0.5 g of the nanocomposite was added to 20 milliliters (mL) of the chloride solution and stirred for 3 hours. The solution was filtered, and the concentration of the chloride ions was measured by ion chromatography. The concentration of chloride ions was measured to determine the amount that had been adsorbed by the nanocomposite, and then the adsorption capacity was calculated.

Adsorption capacities of the three nanocomposites are displayed in Table 1. Adsorption capacity is defined as mg of chloride ion adsorbed per gram of nanocomposite. The nanocomposite that included both the aluminum and iron nanoparticles had the highest adsorption capacity.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of adsorbing chloride ions from an aqueous solution, comprising:
   contacting a nanocomposite with the aqueous solution to form a mixture;
   wherein the nanocomposite adsorbs at least a portion of the chloride ions in the aqueous solution;
   wherein the nanocomposite comprises:
   iron nanoparticles;
   aluminum nanoparticles; and
   guar gum;
   wherein the nanocomposite is in the form of extruded cylindrical particles in which the iron nanoparticles and the aluminum nanoparticles are dispersed in a matrix of the guar gum; and
   wherein the nanocomposite comprises:
   15-25 wt. % iron nanoparticles;
   15-25 wt. % aluminum nanoparticles; and
   50-70 wt. % guar gum, based on a total weight of the iron nanoparticles, aluminum nanoparticles, and guar gum.

2. The method of claim 1, wherein the iron nanoparticles have a spherical shape.

3. The method of claim 1, wherein the iron nanoparticles have an average size of 50-500 nm.

4. The method of claim 1, wherein the iron nanoparticles form agglomerates; and
   wherein the agglomerates have a size of 100-1,000 nm.

5. The method of claim 1, wherein the aluminum nanoparticles have a spherical shape.

6. The method of claim 1, wherein the aluminum nanoparticles have an average size of 10-300 nm.

7. The method of claim 1, wherein the aluminum nanoparticles form agglomerates; and
   wherein the agglomerates have a size greater than 1,000 nm.

8. The method of claim 1, wherein the extruded cylindrical particles have a helical shape and a rough surface.

9. The method of claim 1, wherein the extruded cylindrical particles have a length of 0.1 to 100 cm.

10. The method of claim 1, wherein the extruded cylindrical particles have a diameter of 0.1 to 10 cm.

11. The method of claim 1, further comprising separating the aqueous solution from the mixture to leave the nanocomposite with adsorbed chloride ions.

12. The method of claim 1, further comprising stirring the mixture for at least one hour.

13. The method of claim 1, further comprising heating the mixture to a temperature of 50-100° C.

14. The method of claim 1, wherein the aqueous solution comprises at least one additional ion selected from the group consisting of calcium, bicarbonate, magnesium, sodium, potassium, nitrate, and sulfate.

15. The method of claim 1, wherein the mixture has a ratio of mg of chloride ion to mg of nanocomposite of 1:1 to 1:10.

16. The method of claim 1, wherein the nanocomposite has a chloride ion adsorption capacity of 330-360 mg of chloride ion per gram of nanocomposite (mg/g).

17. A method of adsorbing chloride ions from an aqueous solution, comprising: contacting a nanocomposite with the aqueous solution to form a mixture;
   wherein the nanocomposite adsorbs at least a portion of the chloride ions in the aqueous solution;
   wherein the nanocomposite comprises:
   iron nanoparticles;
   aluminum nanoparticles; and
   guar gum;
   wherein the nanocomposite is in the form of extruded cylindrical particles in which the iron nanoparticles and the aluminum nanoparticles are dispersed in a matrix of the guar gum; and
   wherein the iron nanoparticles comprise:
   30-40 wt. % iron; and
   60-70 wt. % oxygen, based on a total weight of the iron and oxygen in the iron nanoparticles.

18. A method of adsorbing chloride ions from an aqueous solution, comprising: contacting a nanocomposite with the aqueous solution to form a mixture;
   wherein the nanocomposite adsorbs at least a portion of the chloride ions in the aqueous solution;
   wherein the nanocomposite comprises:
   iron nanoparticles;
   aluminum nanoparticles; and
   guar gum; and
   wherein the nanocomposite is in the form of extruded cylindrical particles in which the iron nanoparticles and the aluminum nanoparticles are dispersed in a matrix of the guar gum; and
   wherein the aluminum nanoparticles comprise:
   30-40 wt. % aluminum; and
   60-70 wt. % oxygen, based on a total weight of the aluminum and oxygen in the aluminum nanoparticles.

* * * * *